United States Patent
Elliot et al.

(10) Patent No.: US 6,530,832 B2
(45) Date of Patent: Mar. 11, 2003

(54) HEATING AND/OR AIR-CONDITIONING INSTALLATION HAVING AT LEAST ONE DE-ICING OUTLET

(75) Inventors: Gilles Elliot, Courcouronnes (FR); Carine Paumier, Versailles (FR); Guillaume Foury, Elancourt (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/799,105

(22) Filed: Mar. 6, 2001

(65) Prior Publication Data

US 2001/0021634 A1 Sep. 13, 2001

(30) Foreign Application Priority Data

Mar. 6, 2000 (FR) .............................. 00 02831

(51) Int. Cl.[7] .................................. B60S 1/54
(52) U.S. Cl. ........................ 454/127; 454/152
(58) Field of Search ................ 454/121, 127, 454/152

(56) References Cited

U.S. PATENT DOCUMENTS 5,964,658 A * 10/1999 Aizawa .................. 454/121 X

FOREIGN PATENT DOCUMENTS

| DE | 19801979 | 7/1998 |
|----|----------|--------|
| EP | 0713792 | 5/1996 |
| GB | 1341953 | 12/1973 |

* cited by examiner

Primary Examiner—Harold Joyce
(74) Attorney, Agent, or Firm—Liniak, Berenato & White

(57) ABSTRACT

A heating and/or air-conditioning installation has a de-icing outlet with a de-icing opening adjoining a window, an air-diffusion element with a low output per unit surface area, and an air-distributing element. The air-distributing element has at least a first and a second position. In the first position it blocks the air-diffusion element to ensure de-icing of the window. In the second, it partially blocks the de-icing region so that the output per unit surface area via the de-icing region corresponds to diffusion at a low output per unit surface area, such that the de-icing region and the air-diffusion element provide air diffusion at a low output per unit surface area and their air flows mix.

22 Claims, 3 Drawing Sheets

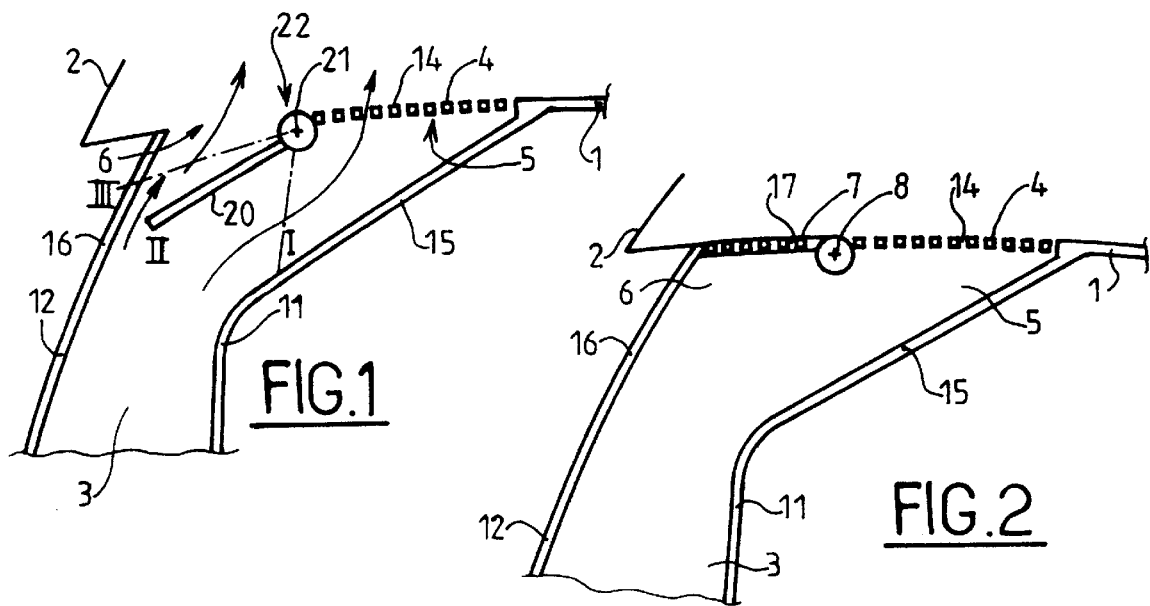
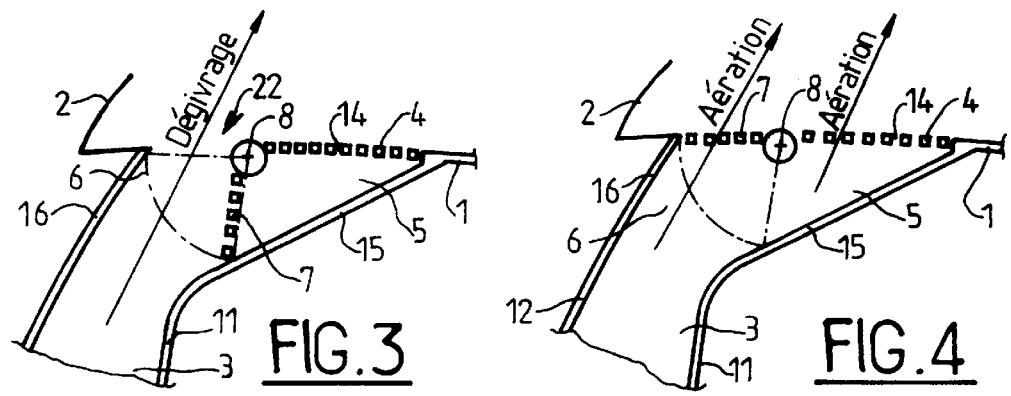
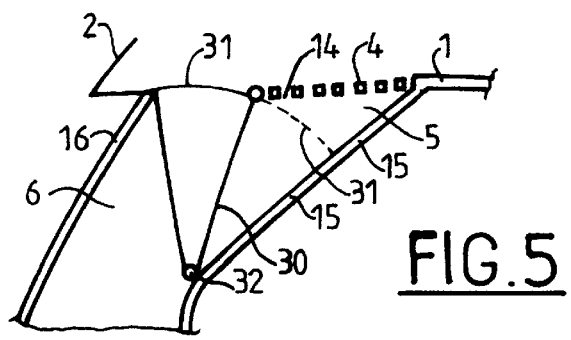

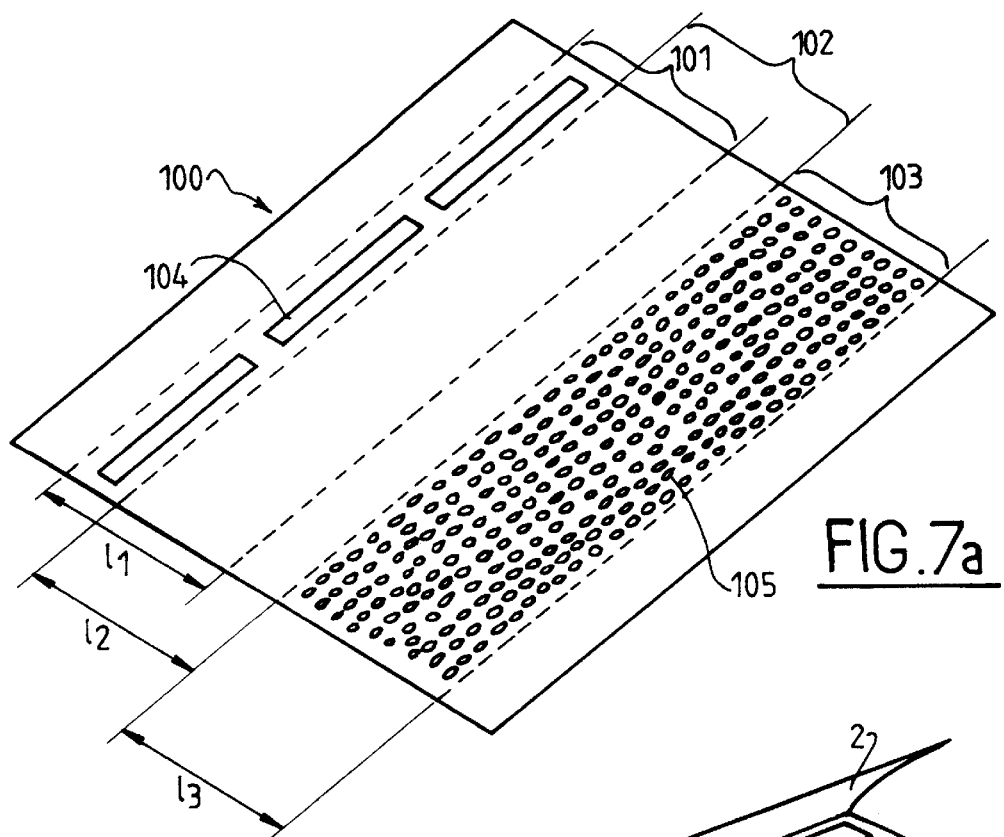
FIG. 7a
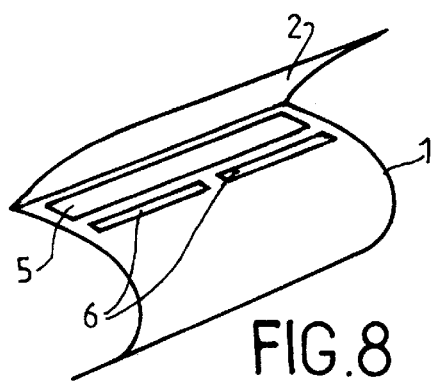
FIG. 8
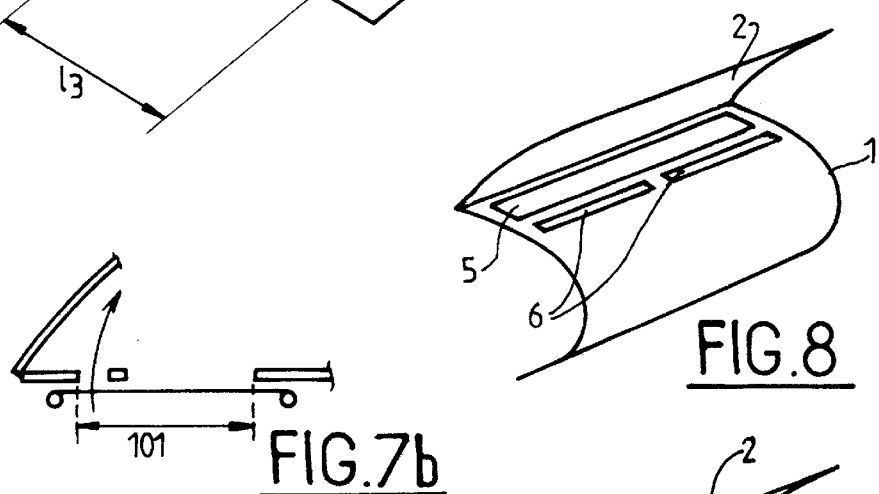
FIG. 7b
FIG. 7c
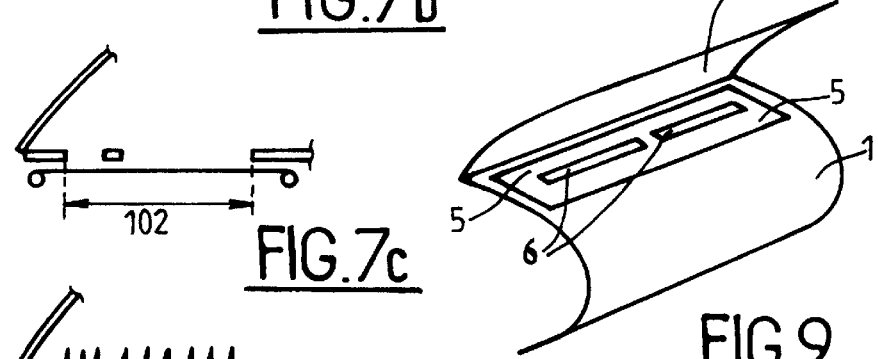
FIG. 9
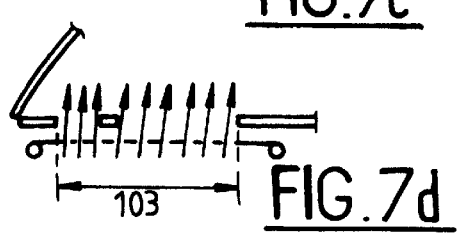
FIG. 7d

HEATING AND/OR AIR-CONDITIONING INSTALLATION HAVING AT LEAST ONE DE-ICING OUTLET

FIELD OF THE INVENTION

The invention relates to a heating and/or air-conditioning installation having at least one de-icing outlet comprising at least one opening close to a window, for example the windscreen of the vehicle, and at least one air-diffusion element with a low output per unit surface area and at least one element for distributing air between at least one de-icing outlet and at least one said air-diffusion element.

BACKGROUND OF THE INVENTION

A device of this kind, intended for the windscreen and the dashboard of a vehicle, is known from European Patent Application EP 713 792, published on May 29, 1996. Here, air is apportioned by a flap.

According to this patent application, two air-diffusion elements are provided on either side of the console of the vehicle, and these elements have surfaces with a large number of holes at a high density per unit surface area so as to provide air diffusion at a low output per unit surface area and a low speed in such a way that the passengers in the vehicle do not feel the displacement of the air as such, allowing the vehicle to be heated and/or air conditioned while maintaining passenger comfort. These perforated surfaces are formed, for example, from a plastic or elastomeric material with an open-cell structure or from a structure having through openings of small diameter or microholes. A perforated film can likewise be used.

A distributing flap controls the passage of the air in an all-or-nothing way either into a de-icing duct for the windscreen or via air-diffusion elements arranged on the upper part of the dashboard.

The de-icing duct occupies a certain area of the dashboard but is used for only a relatively small proportion of the time, solely for de-icing or demisting the windscreen.

The idea on which the invention is based is to make use of the area of the de-icing outlet or outlets to provide diffusion at a low output per unit surface area in such a way as to increase the effectiveness of this diffusion and/or reduce the total area of the openings in the dashboard.

SUMMARY OF THE INVENTION

To this end and according to a first aspect, the invention relates to a heating and/or air-conditioning installation comprising at least one de-icing region having, in particular, at least one de-icing opening provided in a wall of the vehicle, close to a window, and at least one air-diffusion region with a low output per unit surface area, in particular an air-diffusion element fixed relative to the said wall of the vehicle, and at least one element for distributing air between at least one de-icing region and at least once said air-diffusion region, wherein at least one said air-distributing element, for example a flap, has at least two positions, namely:

a first position, in which it blocks the air supply to at least one air-diffusion region to ensure de-icing and/or demisting of the window, for example a windscreen, a second position, in which it partially blocks the air supply to at least one said de-icing region in such a way that the output per unit surface area via at least one de-icing region corresponds to diffusion at a low output per unit surface area in such a way that at least one de-icing region and at least one air-diffusion region simultaneously provide air diffusion at a low output per unit surface area.

Partial blocking of one or more de-icing outlets by one or more guiding elements, for example flaps, provides an additional flow of air at a low flow rate which, even if it does not have the desired properties for multipoint air diffusion at a low output per unit surface area or "gentle diffusion", the principle of which is described in the prior art cited above, nevertheless does not have any disadvantages since this additional flow of air adjoins a main air-diffusion flow provided by one or more air-diffusion regions. The mixing of these two flows thus takes place in a uniform manner and without the passengers perceiving the displacement of the air as such. In particular, where the additional flow is generated between the main flow and the window or where the additional flow is surrounded by the main flow, this main flow of air generated at a multitude of points forms a screen for the additional flow of air. In other words, all the advantages of air diffusion at a low output per unit surface area via a surface with numerous small openings and/or a porous surface are preserved.

It is advantageous that, in the second position of the air-distributing element or elements, the said air diffusion via at least one de-icing region is at an output per unit surface area substantially equal to the output per unit surface area of at least one above-mentioned air-diffusion element.

At least one distributing element can likewise have a third position, in which it blocks at least one de-icing region.

At least one de-icing region can be an opening in an internal wall of the vehicle, and at least one air-diffusion region can be an air-diffusion element fixed relative to a said wall of the vehicle.

At least one air-diffusion element can border at least one de-icing outlet over at least part of its length.

At least one air-distributing element can be an air-distributing flap hinged about an axis situated on a joint line between at least one de-icing outlet and at least one air-diffusion element.

The above-mentioned object is likewise achieved by the invention according to its second aspect, which relates to a heating and/or air-conditioning installation comprising at least one so-called de-icing region close to a window and at least one air-diffusion region with a low output per unit surface area, and at least one element which is intended for distributing air between at least one de-icing region and at least one air-diffusion region and has at least one first position, in which it blocks at least one air-diffusion region, and at least one second position, in which it blocks at least one de-icing region, wherein at least one air-distributing element, for example a flap, is perforated and/or porous, such that when it is placed in the said second position in which it blocks at least one de-icing region adjoining at least one air-diffusion region, the output per unit surface area via at least one de-icing region corresponds to a low output per unit surface area, such that at least one de-icing region and at least one air-diffusion region provide air diffusion at a low output per unit surface area.

According to this second aspect of the invention, when at least one distributing element blocks at least one de-icing element it adjoins at least one air-diffusion region and, being in the extension of the latter, the total area of the openings thus provided on the upper surface of the dashboard, for example, combines to give multipoint air diffusion at a low output per unit surface area referred to as "gentle diffusion" and thus to the comfort desired for the passengers.

It is advantageous that when at least one air-distributing element is placed in the said second blocking position, the output per unit surface area via at least one said distributing element is substantially equal to the output per unit surface area via at least one air-diffusion element.

At least one de-icing region can be an opening provided in an internal wall of the vehicle, and at least one air-diffusion region can be an air-diffusion element fixed relative to the said wall.

At least one air-diffusion element can border at least one de-icing outlet over at least part of its length.

At least one air-distributing element can be an air-distributing flap.

At least one air-distributing flap can be hinged about an axis situated on a joint line between at least one de-icing outlet and at least one air-diffusion element.

At least one air-distributing element can be capable of displacement by translation opposite the said de-icing and air-diffusion regions. In this case, it can likewise have one or more openings and/or one or more air-diffusion zones with a low output per unit surface area which are positioned at the desired locations in this way by translation of at least one air-distributing element.

The installation can then be characterized in that at least one air-distributing element has:

- at least one opening corresponding to the contour of at least one de-icing region to ensure de-icing and/or demisting;
- at least one air-diffusion zone with a low output per unit surface area to ensure diffusion at a low output per unit surface area via at least one air-diffusion region and/or at least one de-icing region.

It can likewise be characterized in that the air-distributing element has at least one impermeable zone arranged between at least one opening and at least one said air-diffusion zone.

The air-distributing element, which is capable of displacement by translation, is preferably a film coupled to distribution rollers to allow the said displacement.

In general terms, the invention allows control of the distribution of air to be shifted towards the diffusion module, thus allowing a ventilating/de-icing/demisting conduit which is common and hence of reduced cross section to be used between the heating/air-conditioning device proper and the diffusion module.

At least one de-icing region can be arranged between at least one air-diffusion element and the window or can be surrounded by at least one air-diffusion element.

At least one air-diffusion element can be arranged between at least one de-icing region and the said window.

BRIEF DESCRIPTION OF THE DRAWINGS

Other characteristics and advantages of the invention will become more clearly apparent when reading the following description, given by way of non-limiting example, in conjunction with the drawings, in which:

FIG. 1 illustrates a first aspect of the invention;

FIGS. 2 to 4 illustrate the second, preferred, aspect of the invention, FIG. 2 being a general schematic diagram of the device viewed in longitudinal section, and FIGS. 3 and 4 illustrating the respective positions of de-icing and ventilation obtained by displacing the guide flap;

FIG. 5 illustrates a variant of the invention employing a drum-type flap;

FIGS. 7a to 7d illustrate a variant embodiment of the film; and

FIGS. 8 and 9 illustrate two variants of the arrangement of the de-icing/demisting regions and of surface diffusion.

DESCRIPTION OF THE PREFERRED EMBODIMENTS

Figure 6A:
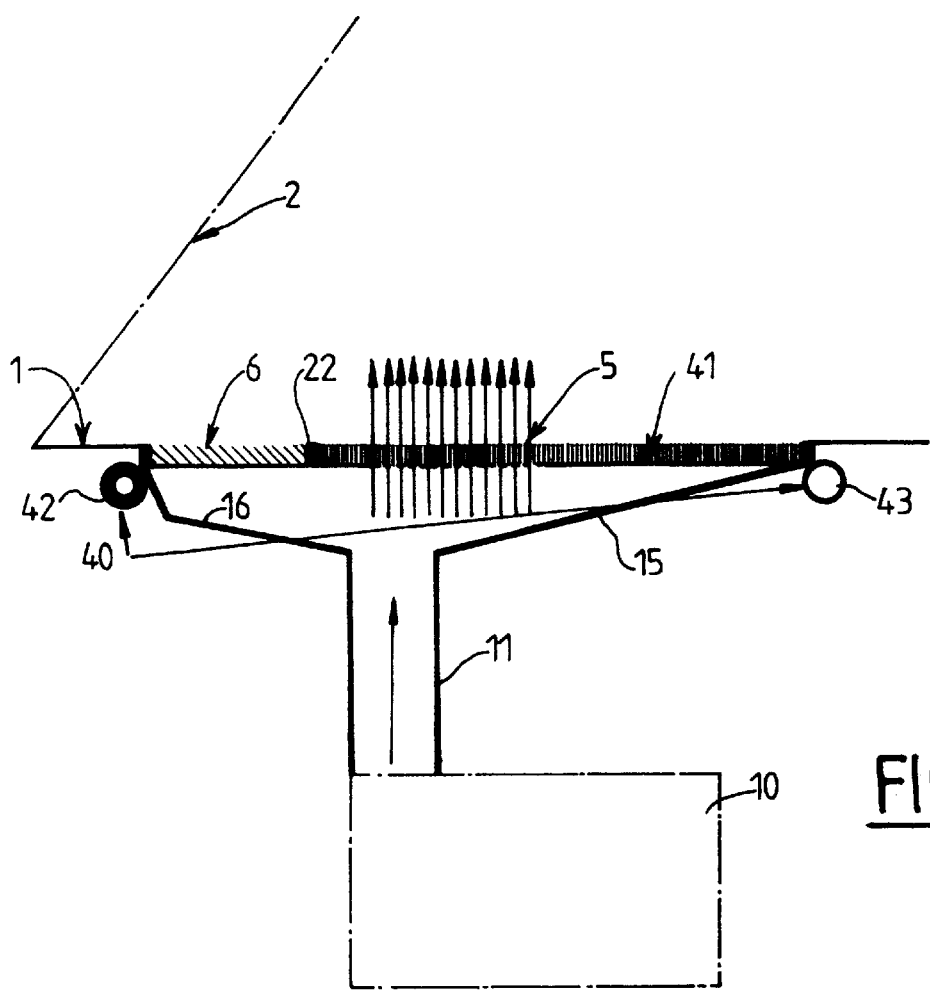
FIGS. 6a and 6b illustrate an embodiment of the invention in section and in plan view respectively, at least one air-distributing element in this embodiment being a film.

According to FIG. 1, the device has an air inlet 3 capable of carrying hot air for de-icing and/or demisting a window 2 or for heating the passenger compartment or of carrying cold air for air conditioning the passenger compartment. This duct is delimited by walls 11 and 12, which diverge at 15 and 16 to supply a diffusion module comprising a forced-diffusion outlet 6 situated in the vicinity of a window 2, in particular the windscreen of the vehicle, and an air-diffusion element with a low output per unit surface area, comprising, for example, a plate 4 having a large number of small openings 14 (for example 1 mm$^2$) The outlet 6 has one or more large openings (for example 1 cm$^2$ or more). In the case of a windscreen, the reference numeral 1 denotes the dashboard, while in the case of ventilation and/or de-icing (or demisting) of a side window 2, the reference numeral 1 denotes the interior edge of the door. A flag-type flap 20, hinged at 21 to the joint 22 between the element 5 and the outlet 6, can be displaced between end positions I and possibly III, in which it blocks the ventilating outlet 5 and the de-icing outlet 6 respectively. The flap 20 has a predetermined intermediate position II, in which it partially blocks the outlet 6 in such a way that its output per unit surface area is compatible with the output per unit surface area for air diffusion at a low output per unit area as mentioned in the cited prior art. In particular, the output per unit surface area thus obtained will be between 0.5 times and two times the output per unit surface area of the ventilating outlet 5, for example, and will preferably be substantially equal to it.

By virtue of the fact that, owing to the construction, the surface area allocated to ventilation via the outlet or outlets 5 is markedly greater than the surface area allocated to de-icing via the outlet or outlets 6, and by virtue of the fact that the outlet or outlets 6 are situated between the ventilation outlet or outlets 5 and the window 2, the mixing of the air flows takes place in conditions such that the passenger does not perceive as such the low-throughput flow of air output via the de-icing outlets 6 in position II of the flap 20. Indeed, a low output per unit surface area via a large opening is not perceived in the same way as a low output per unit surface area via an element such as element 4, which is provided with a multiplicity of holes communicating directly with the passenger compartment. Given the geometry shown, the low output per unit surface area via the outlet or outlets 5 in a certain sense masks the effects of the flow emerging from the outlet or outlets 6 and the flows thus mix without the passengers in the vehicle feeling the displacement of the ventilating air, whether it is being used for heating or air conditioning.

In the embodiment shown in FIGS. 2 to 4, the flap 7 has openings 17 distributed in the same way as the openings 14 in the element or elements 4, for example. In the first position shown in FIG. 3, the flag-type flap 7 blocks the outlet 5 and the majority of the flow passes through the de-icing outlet to de-ice the window 2, for example the windscreen of the vehicle. Indeed, the pressure drop entailed by the passage of the air through the openings in the flap 7 and then those in the element or elements 4 is so much greater than the very small pressure drop over the direct route that almost all the air is directed to de-icing via the opening 6.

In the position shown in FIG. 4, the flap 7 is virtually in alignment with the element or elements 4 and the cross section of flow for air for de-icing is integrated into the cross section of flow for the ventilating air.

As with FIG. 1, this provides a gain in surface area for diffusion on the dashboard and/or at the sides of the vehicle and a gain in volume since the device uses the same conduit 3 to supply air for de-icing and ventilation.

In the embodiment in FIG. 5, the flap 30 is of the drum type and is hinged at 32 on the wall 11 and its blocking face 31, which may be perforated or not, can occupy two positions, in which it blocks either the de-icing outlet 6, as shown in solid lines, or the ventilating outlet 5, as shown in dotted lines, or indeed an intermediate position.

The device according to the invention thus makes it possible to achieve two modes of air diffusion by two methods of air diffusion (forced diffusion, distributed diffusion or gentle diffusion) with one flap at the minimum.

In the ventilating mode (heating and/or air conditioning), distributed diffusion is effected by using all the available cross-section. In the de-icing or demisting mode, only the cross section equal to the size of the flap is used.

The invention is not limited to the embodiments described and shown above. It can have a plurality of flaps 20 and/or 30 and a plurality of openings 5 and/or 6.

The window 2 can likewise be the rear window of the vehicle.

The embodiments described above employ air-distributing elements which are flaps, of the flag or drum type for example.

The invention is not limited to the use of rotary elements.

Figure 6B:
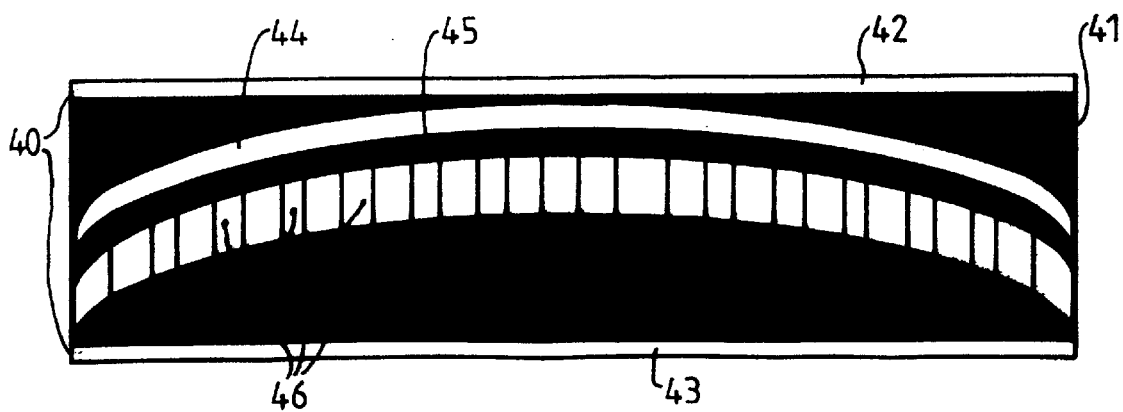

Within the context of the present invention, the air-distributing elements can likewise perform the function intended by executing a translational movement, whether, as in the case of the above examples, the air-distributing element or elements operate in the manner of flaps, or, as described here in relation to FIGS. 6a and 6b, the air-distributing element or elements are films containing air supply openings, whether by forced diffusion (wide openings) or by multipoint diffusion with a low output per unit surface area (small openings or permeable surface(s)).

According to FIGS. 6a and 6b, air distribution is ensured by means of one or more films 41 placed under the air-diffusion zones 5 and 6. The film 1 is rolled onto two parallel spindles 42 and 43, one 42 of which is situated close to the window 2, for example close to the foot of the windscreen of the vehicle, and the other 43 is at a distance from the window and is, for example, disposed in the central part of the dashboard. A winder 40 has a micromotor placed at the end of one of the spindles 42, 43, and a tensioner is arranged on the other spindle 43, 42 in such a way as to keep the film constantly taut and to allow its movement in the two directions of winding and unwinding.

The film has one or more forced-diffusion openings 44 to provide the de-icing function via zone 6, and at least one zone of controlled permeability 46 to ensure diffusion at a low output per unit surface area via the zone 5 and/or 6.

In a first position of the film 41, for example, the position of the opening 44 corresponds to the de-icing zone 6 to provide the de-icing and/or demisting function, while an impermeable region 45 of the film blocks zone 5.

In a second position of the film, region 45 blocks zone 6 and region 46 ensures diffusion at a low output per unit surface area via zone 6.

Finally, in a third position of the film 41, region 46 occupies zones 5 and 6 to ensure diffusion at a low output per unit surface area via zones 5 and 6.

It will be noted that, in FIG. 6a, zones 5 and 6 have been represented as physically separated by a separation element 22. It will be understood that this element 22 can be omitted and that air diffusion (forced and/or at a low output per unit surface area) can be effected via a large opening, zones 5 and 6 being defined by the position of the film 41. This makes it possible to vary the size of these zones, in particular the de-icing zone 6, to a certain extent as a function of the position of the film 41.

When the vehicle stops, the film 41 can be positioned in such a way as to seal diffusion zones 5 and 6 to prevent deposition of dust in these areas.

It is possible to exercise left/right control of the diffusion of air by using two films.

FIG. 7a shows, flattened out, a film 100 which has three bands 101, 102, and 103 of length 11, 12, and 13 respectively. They correspond respectively to the de-icing mode (FIG. 7b) by virtue of openings 104 situated opposite the opening or openings 6, to the function of complete closure of regions 5 and 6 (FIG. 7c) by virtue of the impermeable zone 102 and, finally, to "gentle diffusion" via regions 5 and 6 by virtue of the permeable zone 103, which has multiple small openings 105, for example, to ensure distributed diffusion at a low output per unit surface area.

In all the cases described above, the region (or regions) of distributed diffusion 5 can be situated behind the de-icing/demisting region or regions 6 (as shown in the preceding figures) or in front of the region or regions 6 (FIG. 8). It can likewise be situated on either side of regions 6 or be surrounded by one or more regions 5 (FIG. 9). Owing to the ever steeper slope of the windscreens of new vehicles, it is possible or indeed necessary to move the de-icing nozzles rearward to ensure more efficient demisting and de-icing, freeing up space at the base of the windscreen which can be made use of by the present invention.

What we claim is:

1. A heating and air-conditioning installation for a vehicle comprising:
   at least one de-icing region disposed adjacent a window of said vehicle and at least one air-diffusion region with a low output per unit surface area, said at least one de-icing region adjoining said at least one air-diffusion region, and at least one air-distributing element provided to selectively distribute air between said at least one de-icing region and said at least one air-diffusion region, said air-distributing element having at least one first position which blocks said at least one air-diffusion region, and at least one second position which blocks said at least one de-icing region, wherein said at least one air-distributing element is porous such that when placed in said second position an output per unit surface area via said at least one de-icing region corresponds to said low output per unit surface area of said at least one air-diffusion region, such that said at least one de-icing region and said at least one air-diffusion region together provide air diffusion at a low output per unit surface area.

2. The installation of claim 1, wherein when said at least one air-distributing element is placed in said second position, an output per unit surface area via said at least one de-icing region is substantially equal to the output per unit surface area via said at least one air-diffusion region.

3. The installation of claim 1, wherein said at least one de-icing region is an opening provided in an internal wall of the vehicle, and said at least one air diffusion region is an air-diffusion element fixed relative to the wall of the vehicle.

4. The installation of claim 1, wherein said at least one air-diffusion region borders said at least one de-icing region over at least part of its length.

5. The installation of claim 1, wherein at least one de-icing region is arranged between said at least one air-diffusion region and the window or is surrounded by said at least one air-diffusion region.

6. The installation of claim 1, wherein said at least one air-diffusion region is arranged between said at least one de-icing region and said window.

7. The installation of claim 1, wherein said at least one air-distributing element is an air-distributing flap.

8. The installation of claim 7, wherein said at least one air-distributing flap is hinged about an axis situated on a joint line between said at least one de-icing outlet and said at least one air-diffusion element.

9. The installation of claim 1, wherein said at least one de-icing region is an opening provided in an internal wall of the vehicle, and at least one air diffusion region is an air-diffusion element fixed relative to said wall of the vehicle.

10. The installation of claim 1, wherein said at least one air-diffusion region borders at least one de-icing outlet over at least part of its length.

11. The installation of claim 1, wherein said at least one de-icing region is arranged between said at least one air-diffusion region and said window or is surrounded by said at least one air-diffusion region.

12. The installation of claim 1, wherein said at least one air-diffusion region is arranged between said at least one de-icing region and said window.

13. The installation of claim 1, wherein said at least one air-distributing element is an air distributing flap.

14. The installation of claim 13, wherein said at least one air-distributing flap is hinged about an axis situated on a joint line between at least one de-icing region and said at least one air-diffusion region.

15. The installation of claim 1, wherein said at least one air-distributing element is capable of displacement by translation opposite said de-icing and air diffusion regions.

16. The installation of claim 15, wherein said at least one said air-distributing element has:
- at least one opening corresponding to a contour of said at least one de-icing region to ensure de-icing and/or demisting;
- at least one air-diffusion zone with a low output per unit surface area to ensure diffusion at a low output per unit surface area via said at least one air-diffusion region and/or at least one de-icing region.

17. The installation of claim 16, wherein the air-distributing element has at least one impermeable zone arranged between said at least one opening and said air-diffusion zone.

18. The installation of claim 16, wherein the air-distributing element, which is capable of displacement by translation, is a film coupled to distribution rollers to allow said displacement.

19. The installation of claim 1, wherein said air-distributing element has a plurality of openings having an area of approximately $1_{mm}{}^2$.

20. The installation of claim 7, wherein said air-distributing element has a plurality of openings.

21. The installation of claim 20, wherein said at least one air-diffusion region includes a plate having a plurality of openings having a size corresponding to said openings in said air-distributing element.

22. The installation of claim 21, wherein said plurality of openings of said plate and said air distributing element each have an area of approximately $1_{mm}{}^2$.

* * * * *